(12) United States Patent
Lim et al.

(10) Patent No.: US 12,122,219 B2
(45) Date of Patent: Oct. 22, 2024

(54) PTC UNIT FOR VEHICLE HEATER AND PTC HEATER INCLUDING THE SAME

(71) Applicant: AMOSENSE CO., LTD, Chungcheongnam-do (KR)

(72) Inventors: Hyun Chul Lim, Gyeonggi-do (KR); Won San Na, Seoul (KR); Seung Jae Hwang, Incheon (KR)

(73) Assignee: AMOSENSE CO., LTD., Chungcheongnam-do (KR)

( * ) Notice: Subject to any disclaimer, the term of this patent is extended or adjusted under 35 U.S.C. 154(b) by 1335 days.

(21) Appl. No.: 16/090,124

(22) PCT Filed: Mar. 29, 2017

(86) PCT No.: PCT/KR2017/003402
§ 371 (c)(1),
(2) Date: Sep. 28, 2018

(87) PCT Pub. No.: WO2017/171392
PCT Pub. Date: Oct. 5, 2017

(65) Prior Publication Data
US 2019/0111763 A1    Apr. 18, 2019

(30) Foreign Application Priority Data

Mar. 30, 2016   (KR) .................. 10-2016-0038774

(51) Int. Cl.
*B60H 1/22*     (2006.01)
*F24H 3/04*     (2022.01)
(Continued)

(52) U.S. Cl.
CPC ......... *B60H 1/2225* (2013.01); *F24H 3/0435* (2013.01); *F24H 9/1872* (2013.01);
(Continued)

(58) Field of Classification Search
CPC ............ B60H 1/2225; B60H 2001/224; B60H 2001/2268; H05B 3/146; H05B 3/141;
(Continued)

(56) References Cited

U.S. PATENT DOCUMENTS 2,742,448 A * 4/1956 Beacham ........... C08G 59/4092
528/121
6,054,692 A   4/2000 Hitomi et al.
(Continued)

FOREIGN PATENT DOCUMENTS

EP    2292455 A1    3/2011
EP    2902459 A1    8/2015
(Continued)

OTHER PUBLICATIONS

ISA/KR, International Search Report mailed on Jul. 10, 2017, issued in International Application No. PCT/KR2017/003402, total 4 pages with English translation.
(Continued)

*Primary Examiner* — Helena Kosanovic
*Assistant Examiner* — Tiffany T Tran
(74) *Attorney, Agent, or Firm* — MASUVALLEY & PARTNERS; Peter Martinez

(57) ABSTRACT

Provided is a positive temperature coefficient (PTC) unit for a vehicle heater. The PTC unit according to an exemplary embodiment of the present invention includes: a heat generation part which includes PTC elements; and a heat radiation part which is provided on at least one surface of the heat generation part and includes a heat radiation base material and a heat radiation film provided on at least a portion of an outer surface of the heat radiation base material to improve heat radiation performance. According to the present invention, improved heat radiation performance may be exhibited, and concurrently, heat radiation performance
(Continued)

due to excellent durability may be exhibited for a long period of time without a structural change for increasing a specific surface area of a heat radiation part while reducing an air ventilation property, so as to improve heat radiation performance. In addition, since an air ventilation property of the heat radiation part is increased, it is possible to prevent increases in noise and power consumption due to excessive use of peripheral devices such as a fan. Furthermore, since it is possible to prevent overheating of a PTC module and overload of a PTC module control circuit, which are caused by a reduction in the air ventilation property of the heat radiation part, a high-priced and high performance control circuit may not be required, thereby implementing a PTC heater for a vehicle with reduced production costs.

4 Claims, 5 Drawing Sheets

(51) Int. Cl.
| | | |
|---|---|---|
| *F24H 9/1863* | (2022.01) | |
| *F28F 3/02* | (2006.01) | |
| *F28F 21/00* | (2006.01) | |
| *F28F 21/02* | (2006.01) | |
| *H05B 3/02* | (2006.01) | |
| *H05B 3/14* | (2006.01) | |
| *H05B 3/26* | (2006.01) | |
| *H05B 3/50* | (2006.01) | |

(52) U.S. Cl.
CPC ............... *F28F 3/02* (2013.01); *F28F 21/00* (2013.01); *F28F 21/02* (2013.01); *H05B 3/02* (2013.01); *H05B 3/141* (2013.01); *H05B 3/146* (2013.01); *H05B 3/50* (2013.01); *B60H 2001/224* (2013.01); *B60H 2001/2268* (2013.01); *H05B 2203/02* (2013.01); *H05B 2203/023* (2013.01)

(58) Field of Classification Search
CPC ........ H05B 3/02; H05B 3/50; H05B 2203/02; H05B 2203/023; H05B 2203/003; H05B 3/12; F24H 3/0435; F24H 9/1872; F28F 3/02; F28F 21/00; F28F 21/02; F28F 3/025
See application file for complete search history.

(56) References Cited

U.S. PATENT DOCUMENTS

| | | | | |
|---|---|---|---|---|
| 8,158,730 | B2* | 5/2012 | Miyamoto | C08G 69/26 525/419 |
| 2003/0108710 | A1* | 6/2003 | Coyle | B29D 17/00 428/64.4 |
| 2004/0160752 | A1* | 8/2004 | Yamashita | H05K 1/16 361/766 |
| 2005/0237148 | A1* | 10/2005 | Mori | H01C 7/10 |
| 2007/0095809 | A1* | 5/2007 | Lee | A45D 2/36 |
| 2012/0111549 | A1* | 5/2012 | Fukuta | F28F 13/185 165/177 |
| 2015/0122473 | A1* | 5/2015 | Nii | B60H 1/2218 165/202 |
| 2015/0343883 | A1* | 12/2015 | Gu | B60H 1/22 |
| 2016/0122466 | A1* | 5/2016 | Nakamura | C08G 59/24 549/523 |

FOREIGN PATENT DOCUMENTS

| | | | | |
|---|---|---|---|---|
| JP | H0673655 U | * | 3/1993 | ............ B60H 1/2225 |
| JP | 2006-151200 A | | 6/2006 | |
| JP | 2008-189763 A | | 8/2008 | |
| JP | 2009-136848 A | | 6/2009 | |
| JP | 2009136848 | * | 6/2009 | ............... B05B 5/00 |
| JP | 2012-201891 A | | 10/2012 | |
| JP | 2013-100454 A | | 5/2013 | |
| JP | 2014-532159 A | | 12/2014 | |
| KR | 10-1146313 B1 | | 5/2012 | |
| KR | 10-1232569 B1 | | 2/2013 | |
| KR | 10-2014-0029075 A | | 3/2014 | |
| KR | 10-2014-0144942 A | | 12/2014 | |
| KR | 10-1500194 B1 | | 3/2015 | |
| KR | 10-2015-0081441 A | | 7/2015 | |
| WO | WO 2016111358 A1 | | 7/2016 | |

OTHER PUBLICATIONS

Japan Patent Office; Office Action mailed on Jul. 30, 2019 issued in corresponding Japanese Patent Application No. 2018-551795, total 11 pages with English translation.

* cited by examiner

PTC UNIT FOR VEHICLE HEATER AND PTC HEATER INCLUDING THE SAME

RELATED APPLICATIONS

This application is the U.S. National Phase application under 35 U.S.C. § 371 of International Patent Application No. PCT/KR2017/003402, International Filing Date Mar. 29, 2017, entitled "PTC UNIT FOR VEHICLE HEATER, PTC HEATER INCLUDING SAME, AND AIR CONDITIONING DEVICE FOR VEHICLE"; which claims priority to Korean Patent Application No. 10-2016-0038774 filed on Mar. 30, 2016, which are hereby expressly incorporated by reference in their entirety for all purposes.

TECHNICAL FIELD

The present invention relates to a positive temperature coefficient (PTC) module, and more particularly, to a PTC module for a vehicle heater, which has excellent durability and exhibits improved heat radiation performance to prevent overload and reductions in performance and durability of peripheral devices such as a fan, to minimize noise generation in a vehicle, and to reduce power consumption of the vehicle, a PTC heater including the same, and an air conditioning device.

BACKGROUND ART

In a hybrid vehicle or an electric vehicle, since use of an engine is limited or the engine is not used, an engine coolant for heating may be deficient or may not be obtained.

In order to prevent problems, a method has been used which heats a vehicle interior by using a separate preheating heater for a certain period of time while an engine is heated. A conventional heater using a heating wire coil has a high heat generation amount, so that heating is effectively performed. However, a fire risk is high, and since a lifespan of an electric heating wire is short, repair and replacement of components frequently occur, which is inconvenient.

Therefore, a positive temperature coefficient (PTC) heater using PTC elements, which perform heating by using electric energy of a battery, has been used as an auxiliary heating device for heating at an early stage of starting.

The PTC heater may be semi-permanently used due to a low fire risk and a long lifespan. A PTC heater having relatively small capacity has been mainly used. Recently, a PTC heater having high capacity has been demanded and developed according to necessity of users and various kinds of vehicles including an electric vehicle.

The PTC heater includes a heater unit including PTC elements and a circuit unit configured to control turn on/off of the PTC elements. The PTC heater further includes a fan configured to blow heat radiated from the PTC heater into a vehicle interior and thus is implemented into an air conditioning device for a vehicle.

Meanwhile, the heater unit includes collocated heat radiation fins or a plurality of discontinuous heat radiation fins in order to radiate heat generated by the PTC element to the maximum extent. Some attempt to implement higher heat radiation performance by increasing a specific surface area of a heat radiation fin. However, in this case, since a separation distance between the heat radiation fins becomes too narrow, it is very difficult for wind blown by a fan to pass through the PTC heater, resulting in generation of differential pressure and noise. In order to solve such problems, it is necessary to rotate the fan at a faster speed so as to blow air to the PTC heater at a higher pressure/intensity. In addition, the fan, which rapidly rotates, causes a noise problem and a power consumption problem of a vehicle.

Furthermore, when heat radiated from the PTC element is not smoothly transferred to a vehicle interior through air blown by a fan, thermal energy is stagnated in the vicinity of the PTC heater, and the stagnated thermal energy causes overheating and a reduction in performance of a circuit unit provided adjacent to the PTC elements to control the PTC elements. Thus, a high-priced and high performance control circuit should be provided.

Accordingly, there is an urgent need to develop a heat radiation member for a PTC heater, in which heat generated in PTC elements is radiated at very high efficiency without reducing a separation distance between heat radiation fins, and thus, a fan does not need to be used at high speed and a high capacity fan is not required, thereby reducing overall power consumption and concurrently maintaining performance and durability of a circuit unit configured to control operations of PTC elements, or peripheral electronic components.

DISCLOSURE

Technical Problem

The present invention has been made in consideration of the above problems and is directed to providing a positive temperature coefficient (PTC) unit for a vehicle, which is able to exhibit improved heat radiation performance and concurrently has excellent durability of heat radiation performance without a structural change for increasing a specific surface area of a heat radiation part while reducing an air ventilation property, so as to improve heat radiation performance.

In addition, the present invention is directed to providing a positive temperature coefficient (PTC) unit for a vehicle, in which since an air ventilation property of a heat radiation part is increased, it is possible to prevent overload of peripheral devices such as a fan, thereby preventing a reduction in performance/durability and an increase in power consumption due to excessive use of the peripheral devices.

Furthermore, the present invention is directed to providing a positive temperature coefficient (PTC) heater for a vehicle, in which since it is possible to prevent overheating of a PTC module and overload of a PTC module control circuit, which are caused by a reduction in an air ventilation property of a heat radiation part, a high-priced and high performance control circuit may not be required, thereby reducing production costs In addition, the present invention is directed to providing an air conditioning device for a vehicle, in which, while an air flow rate is maintained at an optimal level, it is possible to smoothly blow heated air to a vehicle interior, thereby reducing overall power consumption of a vehicle and stably circulating air.

Technical Solution

In order to solve the above problems, the present invention provides a positive temperature coefficient unit for a vehicle heater including: a heat generation part which includes positive temperature coefficient elements; and a heat radiation part which is provided on at least one surface of the heat generation part and includes a heat radiation base material and a heat radiation film provided on at least a portion of an outer surface of the heat radiation base material to improve heat radiation performance.

According to an exemplary embodiment of the present invention, the heat generation part may include the positive temperature coefficient elements and an electrode terminal configured to support the positive temperature coefficient elements and apply power to the positive temperature coefficient elements.

The heat radiation base material may include a heat radiation plate disposed adjacent to the heat generation part and a heat radiation fin portion fixed on the heat radiation plate.

The heat radiation fin portion may be provided in such a manner that a planar heat radiation body is bent multiple times and is provided on the heat radiation plate or a plurality of planar heat radiation bodies disposed perpendicular to the heat radiation plate are spaced apart from each other by a certain interval and are provided on the heat radiation plate.

The heat radiation film may be provided on an outer surface of at least one of the heat radiation fin portion and the heat radiation plate.

The heat radiation film may be an oxide film or a heat radiation coating layer.

The heat radiation coating layer may be formed through an insulating heat radiation coating composition which includes a coating layer-forming component including a main resin, and an insulating heat radiation filler included in an amount of 25-70 parts by weight with respect to 100 parts by weight of the main resin.

The main resin may include a compound represented by Formula 1 below.

The insulating heat radiation filler may include silicon carbide.

The insulating heat radiation filler may have an average particle diameter of 10 nm to 15 μm. A D50 to D97 ratio of the insulating heat radiation filler may be less than or equal to 1:4.5.

The insulating heat radiation coating composition has a viscosity of 5 cps to 600 cps.

The present invention provides a positive temperature coefficient heater for a vehicle including: a positive temperature coefficient module according to the present invention; and a circuit module which is electrically connected to the positive temperature coefficient module.

The present invention provides an air conditioning device for vehicle including: a fan which blows air to the positive temperature coefficient heater; and the positive temperature coefficient heater according to the present invention, which heats the air blown from the fan.

Advantageous Effects

According to the present invention, a positive temperature coefficient heater (PTC) unit of the present invention can exhibit improved heat radiation performance and concurrently exhibit excellent heat radiation performance due to excellent durability for a long period of time without a structural change for increasing a specific surface area of a heat radiation part while reducing an air ventilation property, so as to improve heat radiation performance. In addition, since an air ventilation property of the heat radiation part is increased, it is possible to prevent increases in noise and power consumption due to excessive use of peripheral

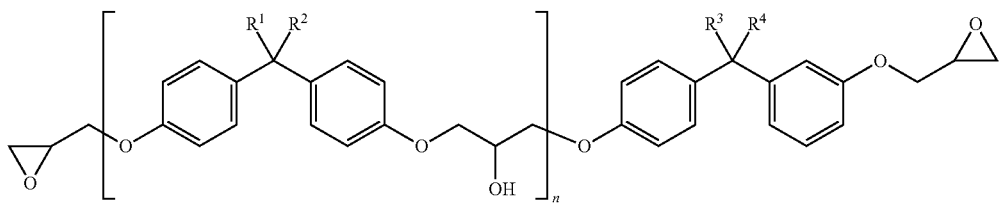

[Formula 1]

$R^1$ and $R^2$ are each independently a hydrogen atom, a $C_1$-$C_5$ linear alkyl group, or a $C_3$-$C_5$ branched alkyl group, and $R^3$ and $R^4$ are each independently a hydrogen atom, a $C_1$-$C_5$ linear alkyl group, or a $C_3$-$C_5$ branched alkyl group, and n is a rational number which allows a weight average molecular weight of the compound represented by Formula 1 to be in a range of 400 to 4,000.

The coating layer-forming component may further include a curing agent included in an amount of 25-100 parts by weight with respect to 100 parts by weight of the main resin. The curing agent may include one or more selected from the group consisting of an aliphatic polyamine-based curing agent, an aromatic polyamine-based curing agent, an acid anhydride-based curing agent, and a catalyst-based curing agent.

The curing agent may include a first curing agent and a second curing agent in a weight ratio of 1:0.5 to 1:1.5, wherein the first curing agent includes an aliphatic polyamine-based curing agent and the second curing agent includes one or more selected from the group consisting of an aromatic polyamine-based curing agent, an acid anhydride-based curing agent, and a catalyst-based curing agent.

devices such as a fan. Furthermore, since it is possible to prevent overheating of a PTC module and overload of a PTC module control circuit, which are caused by a reduction in the air ventilation property of the heat radiation part, a high-priced and high performance control circuit may not be required, thereby implementing a PTC heater for a vehicle with reduced production costs. In addition, while an air flow rate is maintained at an optimal level, it is possible to smoothly blow heated air to a vehicle interior, thereby reducing overall power consumption of a vehicle and implementing an air conditioning device for a vehicle, capable of stably circulating air.

DESCRIPTION OF DRAWINGS

FIG. 2 is a set of views illustrating a PTC unit according to the exemplary embodiment of the present invention.

FIG. 3 is a set of views illustrating a heat radiation part included in the PTC unit according to the exemplary embodiment of the present invention.

MODES OF THE INVENTION

Figure 1:
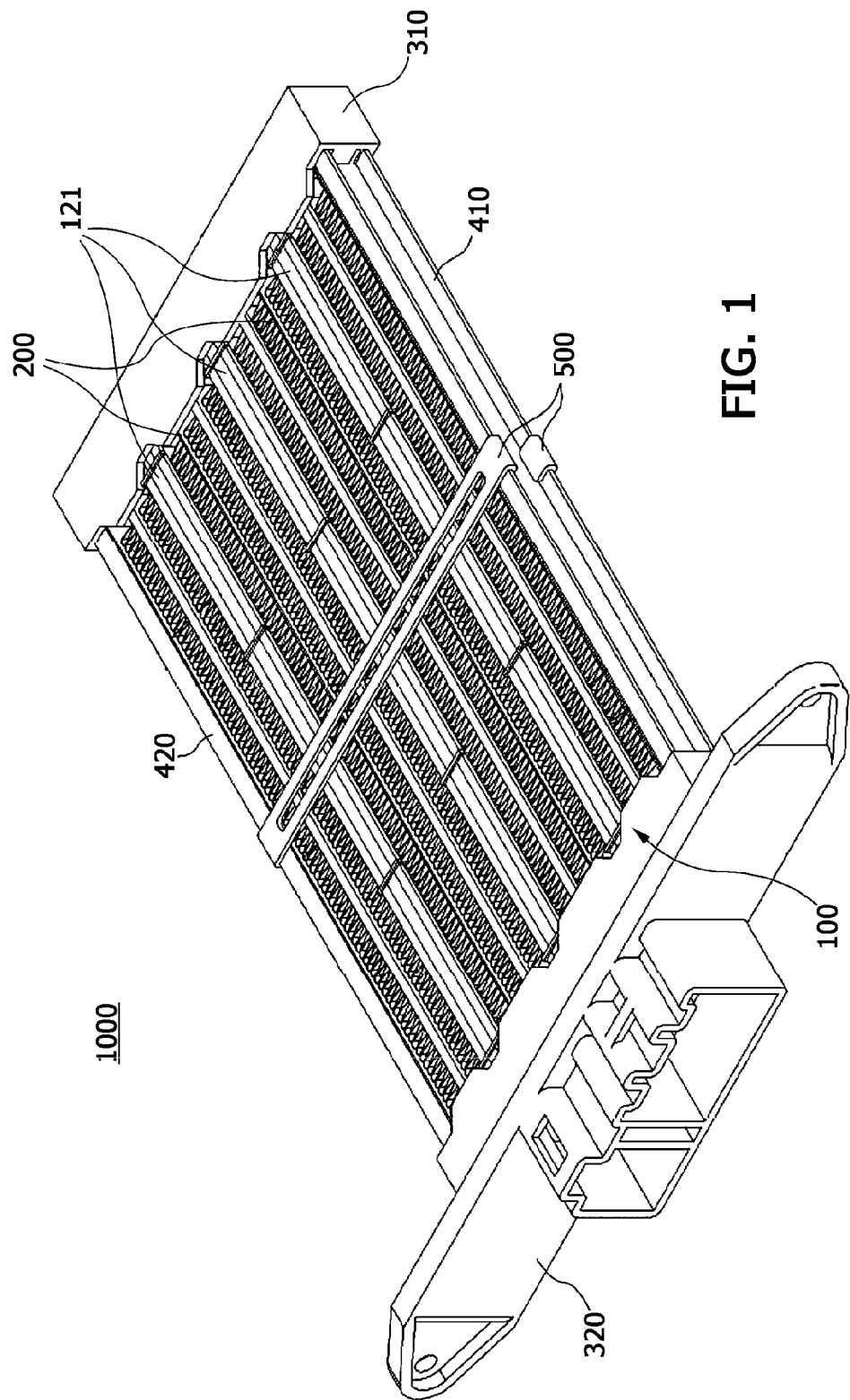
FIG. 1 is a perspective view illustrating a PTC module according to an exemplary embodiment of the present invention.

Hereinafter, exemplary embodiments of the present invention will be described in detail with reference to the accompanying drawings so as to be easily practiced by a person of ordinary skill in the art. It should be understood that the present invention may be embodied in different ways and is not limited to the following exemplary embodiments. Parts irrelevant to description are omitted in the drawings in order to clearly explain embodiments of the present invention, and like reference numerals refer to like elements throughout the specification.

As shown in FIG. 1, a positive temperature coefficient (PTC) module 1000 according to an exemplary embodiment of the present invention may include a plurality of PTC units 100 which each include a heat generation part 120 including PTC elements (not shown) and heat radiation parts 110 and are disposed in parallel to each other. The PTC module 100 may further include negative electrode terminals 200 disposed between the PTC units, side support members 410 and 420 disposed on both sides of the PTC units 100 and the negative electrode terminals 200 to support the PTC units 100 and the negative electrode terminals 200, coupling members 500 disposed at a central portion of the PTC units 100, the negative electrode terminals 200, and the side support members 410 and 420 to support the PTC units 100, the negative electrode terminals 200, and the side support members 410 and 420, and end caps 310 and 320 configured to fix both ends of the PTC units 100, the negative electrode terminals 200, and the side support members 410 and 420.

Figure 2A:
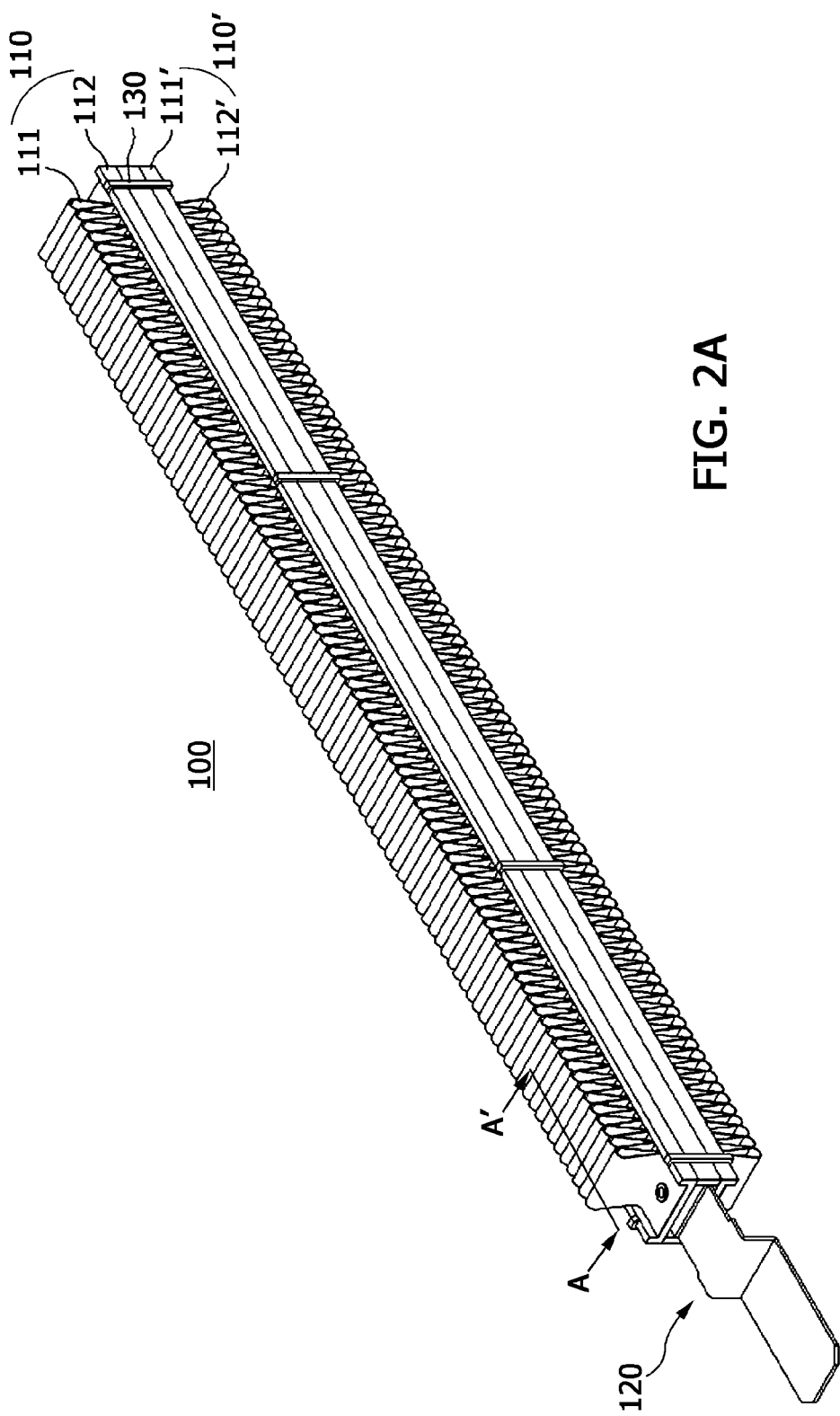
FIG. 2A is a perspective view illustrating the PTC unit.

As shown in FIG. 2A, the PTC unit 100 may include the heat generation part 120 and heat radiation parts 110 and 110' provided on both side surfaces of the heat generation part. Unlike FIG. 2A, the heat radiation part 110 or 110' may be provided only on one side surface of the heat generation part 120 and may be implemented into a PTC unit. However, the heat radiation parts 110 and 110' may be provided on both side surfaces of the heat generation part 120 in order to radiate heat radiated by the heat generation part 120 to the maximum extent. In addition, the PTC unit 100 may include connection members 130 configured to connect the heat generation part 120 and the heat radiation parts 110 and 110'.

Figure 2B:
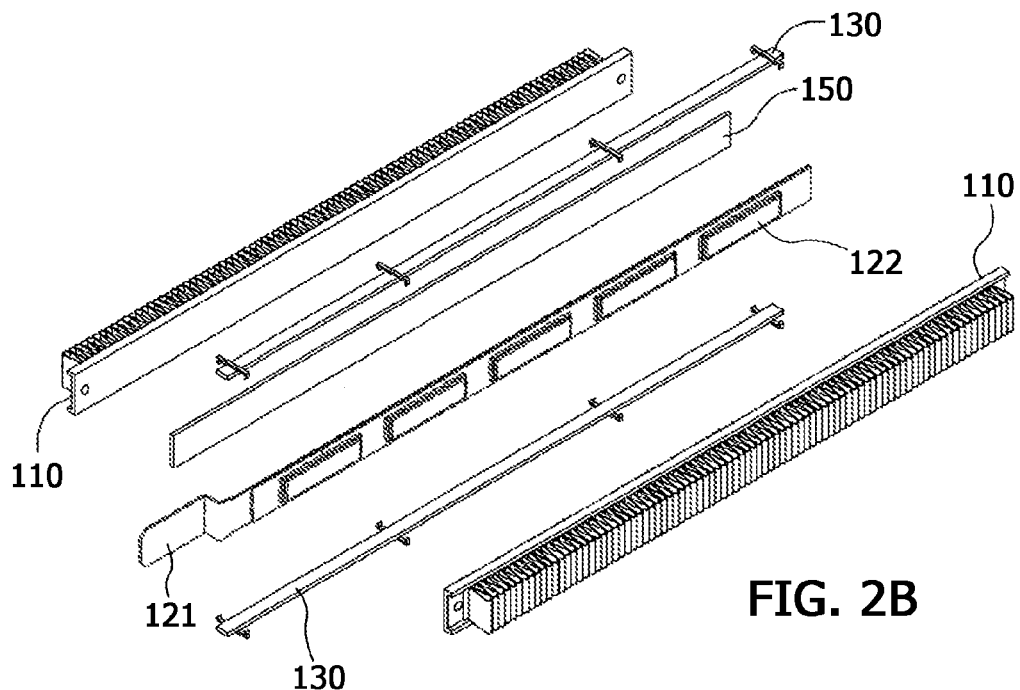
FIG. 2B is an exploded perspective view illustrating the PTC unit.

As shown in FIG. 2B, the heat generation part 120 may include a plurality of PTC elements 122 and an electrode terminal 121 capable of applying power to the PTC elements 122 and concurrently supporting the PTC elements 122.

The PTC element 122 is a resistor of which a resistance value abruptly increases at a specific temperature or more. A known element exhibiting such a physical property may be used without limitation. In an example, the known element may be a barium titanate-based semiconductor.

The plurality of PTC elements 122 may be provided on the electrode terminal 121 so as to be spaced apart from each other in a lengthwise direction of the electrode terminal 121. In this case, the PTC elements 122 may be attached to the electrode terminal 121 through a separate adhesive member in a state of being in contact with a surface of the electrode terminal 121. Alternatively, the electrode terminal 121 may include perforated coupling portions for physically mounting and coupling the PTC elements 122, so that the PTC elements 122 may be fitted and coupled to the coupling portions.

The electrode terminal 121 may be a positive electrode terminal or a negative electrode terminal according to an electrical configuration of the PTC module 100.

On the other hand, since the electrode terminal 200 having a polarity opposite the polarity of an electrode provided in the PTC unit 100 may be interposed between the PTC units 100 as shown in FIG. 1, an insulating member 150 may be provided on one side surface of the heat generation part of the PTC unit 100. Due to the insulating member 150, it is possible to prevent a short circuit caused by the electrode terminal 120 having an opposite polarity, which is disposed adjacent to the heat radiation part 110.

The heat radiation part 110 is for radiating heat generated by the PTC elements of the heat generation part 120 into air and includes heat radiation base materials 111 and 112.

As shown in FIGS. 2A and 2B, the heat radiation base materials 111 and 112 may include a heat radiation plate 112 disposed adjacent to the heat generation part 120 and a heat radiation fin portion 111 fixed to the heat radiation plate 112.

The heat radiation plate 112 is a planar plate for increasing a contact area with the heat generation part 120. The heat radiation plate 112 may be a known heat radiation material and may be thermal conductive plastic including a metallic, nonmetallic, or thermal conductive filler, for example, a filler such as graphene, graphite, or carbon black.

The radiation fin portion 111 may have a structure for maximizing a contact area with air so as to very rapidly radiate heat conducted to the heat radiation plate 112 into the air. In an example, as shown in FIG. 2A, the heat radiation fin portion 111 may be formed in such a manner that a planar heat radiation body is bent multiple times and one surface in a lengthwise direction of the bent heat radiation body is fixed to the heat radiation plate 112. Alternatively, a plurality of planar heat radiation bodies may be spaced apart from each other by a certain interval and may be vertically erected and fixed to the heat radiation plate 112 so as to increase a contact area with air. The specific structure and shape of the heat radiation fin portion 111 are not limited thereto. The structure and shape of a heat radiation fin portion included in a heater for a vehicle may be applied without limitation.

However, as described above, air blown from a fan is blown from one side of the heat radiation part to the other side thereof by passing through an empty space of the heat radiation fin portion. When a heat radiation fin portion, in which the number of bending times is increased and an interval between bent portions is narrow to increase a contact area between the heat radiation fin portion and air, is provided, or a heat radiation part, in which a plurality of planar heat radiation bodies are provided at very narrow intervals in the maximum number, is implemented, due to a narrowed air channel, it may be very difficult for air to pass through the heat radiation part, and noise may be generated due to generated differential pressure. Accordingly, even if heat radiation efficiency of the PTC module is very excellent, radiated heat may not be smoothly transferred to a vehicle interior. Thus, the PTC module may not function as an air conditioning device. In addition, since heat radiated from the PTC module 1000 is not transferred to the vehicle interior, the heat may affect other components around the PTC module 1000, for example, a control circuit, thereby reducing the performance of the control unit or increasing power consumption due to overload. On the other hand, in order to allow the air to pass through the narrowed air channel, it is required to blow the air from one side of the PTC module to the other side thereof at very high pressure. To this end, a fan disposed at one side of the PTC module should rotate at higher speed. However, an increase in the number of revolutions of the fan may further increase the noise of a vehicle, caused by the noise of the fan and may increase power consumption of the fan.

Figure 2C:
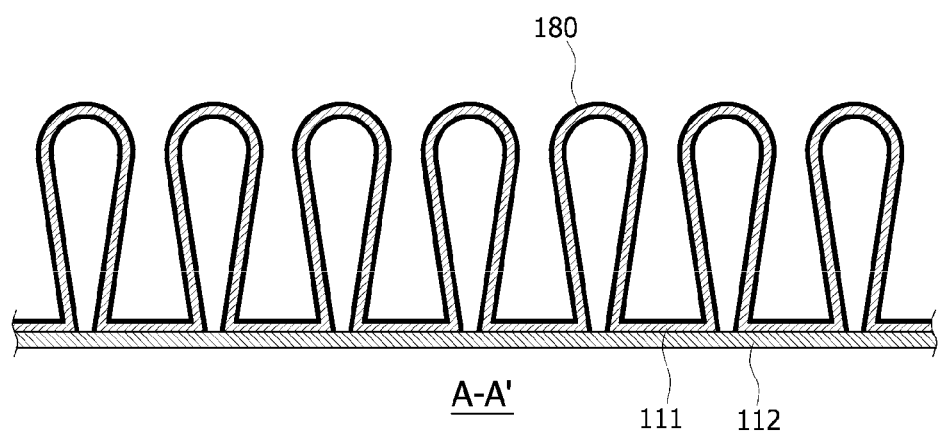
FIG. 2C is a cross-sectional view taken along boundary line A-A' in the PTC unit of FIG. 2A.

Accordingly, the heat radiation part 110 according to the present invention includes a heat radiation film 180 provided on at least a portion of outer surfaces of the heat radiation base materials 111 and 112 as shown in FIG. 2C. Since the heat radiation film 180 increases the heat radiation performance of the heat radiation base materials 111 and 112, it is possible to minimize an excessive structural change of the heat radiation fin portion for increasing a contact area with air. Therefore, it is possible to prevent the air channel from being narrowed and to avoid excessive use of the fan and a configuration of a high priced control circuit due to heat generation, thereby reducing overall power consumption and productions costs of the vehicle.

Figure 3A:
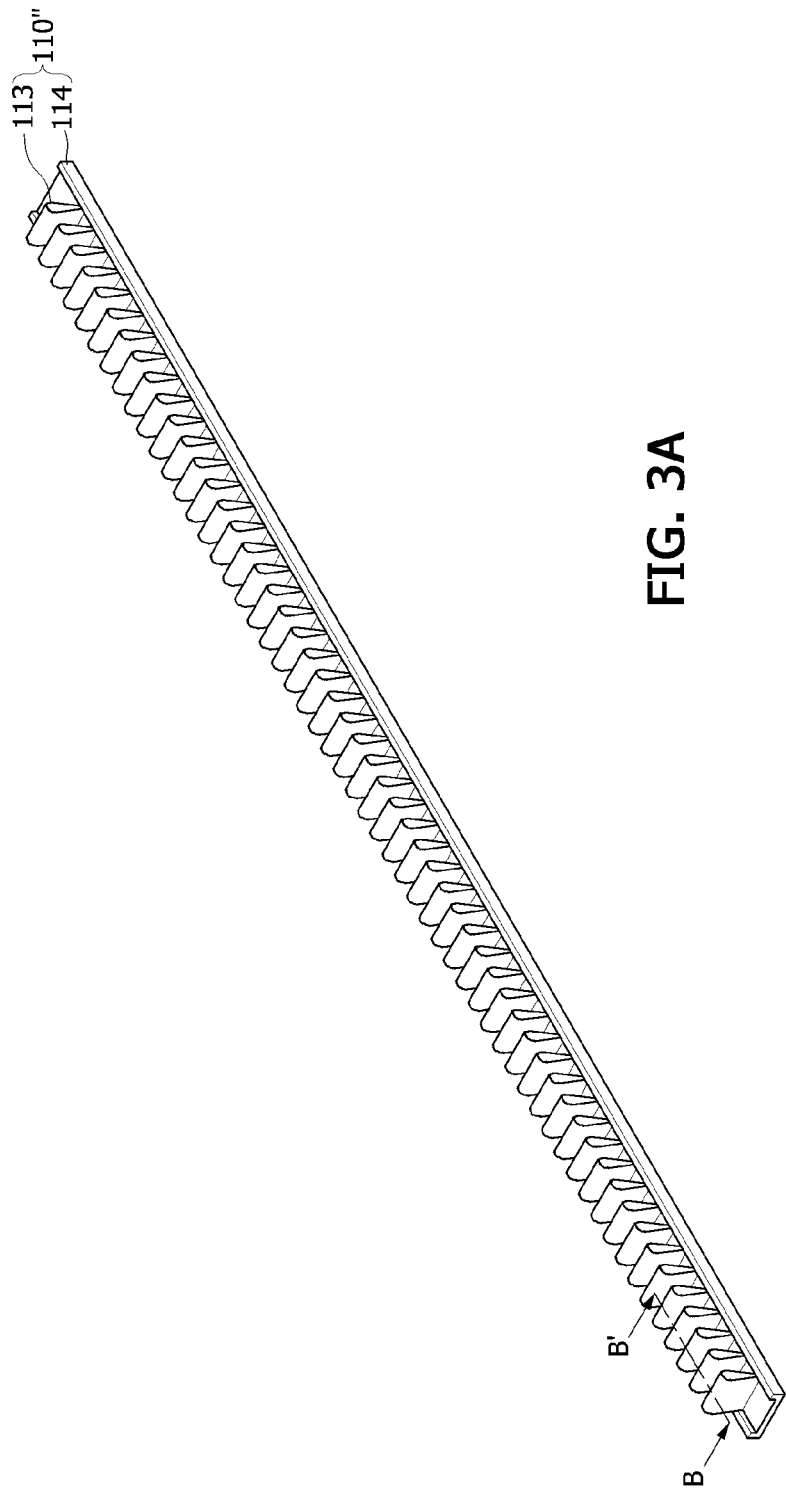
FIG. 3A is a perspective view illustrating the heat radiation part.

As shown in FIG. 3A, the heat radiation film 180 may be coated on a portion including the outer surface of the heat radiation fin portion 111, i.e., a portion of the heat radiation base materials, which is in direct contact with air.

Figure 3B:
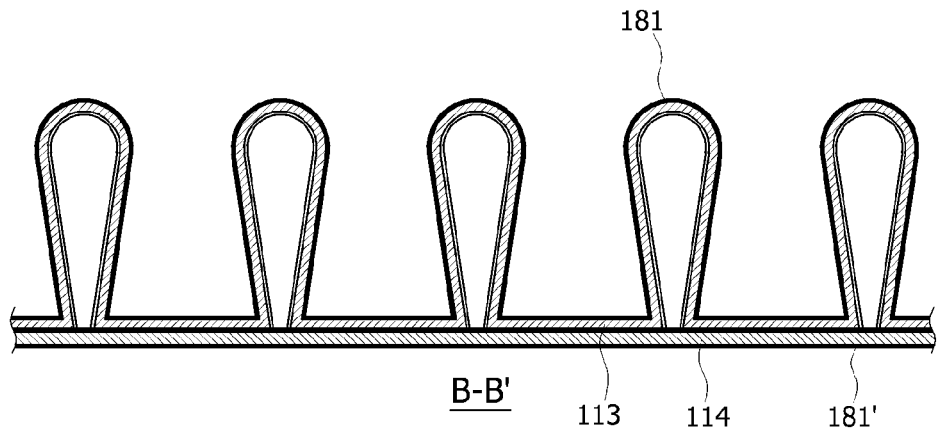
FIG. 3B is a cross-sectional of the heat radiation part taken along boundary line B-B' in the PTC unit of FIG. 3A.

In addition, since the heat radiation film 180 significantly improves heat radiation performance, although a heat radiation part has a structure in which a specific surface area of the heat radiation fin portion is not maximized, the heat radiation part may be employed. Specifically, as shown in FIGS. 3A and 3B, in a heat radiation fin portion 113 of heat radiation base materials 113 and 114, the number of bending times is smaller and a distance between bent portions is greater when compared to the heat radiation fin portion 111 shown in FIGS. 2A and 2C. Therefore, even though the heat radiation fin portion 113 of FIG. 3A has a smaller specific surface area than that of the heat radiation fin portion 111 of FIG. 2A, due to heat radiation films 181 and 181' covering an outer surface of the heat radiation fin portion 113, the heat radiation fin portion 113 of FIG. 3A may exhibit similar or higher heat radiation performance as compared to when the heat radiation fin portion with a shape not including a heat radiation film as shown in FIG. 2A is used in a heat radiation part. Meanwhile, as shown in FIG. 3B, the heat radiation films 181 and 181' may be provided on both of an outer surface of the heat radiation plate 114 and the outer surface of the heat radiation fin portion 113. A portion of the outer surfaces of the heat radiation base materials, on which the heat radiation film is formed, may be changed according to purpose. On the other hand, the heat radiation film 181 is illustrated in FIG. 3B as being provided on the outer surface of the heat radiation fin portion 113, but the heat radiation film may also be provided on an inner surface of the heat radiation fin portion.

In an example, the heat radiation films 180, 181, and 181' may be an oxide film formed by anodizing a heat radiation base material through a known method. Alternatively, in another example, the heat radiation films 180, 181, and 181' may be a heat radiation coating layer. In another example, the heat radiation films 180, 181, and 181' may be formed by further providing a heat radiation coating layer on a heat radiation base material on which an oxide film is formed by anodizing the heat radiation base material.

In an example, the heat radiation films 180, 181, and 181' may be formed through a heat radiation coating composition including a heat radiation filler, and preferably, be formed through an insulating heat radiation coating composition including a heat radiation filler in order to secure electrical reliability as a vehicle component.

In an example, the insulating heat radiation coating composition may include a coating layer-forming component including a main resin and an insulating heat radiation filler included in an amount of 25-70 parts by weight with respect to 100 parts by weight of the main resin.

The coating layer-forming component may include the main resin. When the main resin is a curable resin, the coating layer-forming component may further include a curing agent. The main resin may include any component without limitation as long as the component is capable of forming a coating layer and is known in the art. However, in terms of adhesion to a heat radiation base material, a heat resistance property so as not to be embrittled by heat, an insulating property so as not to be embrittled by electrical stimulation, mechanical strength, and compatibility with an insulating heat radiation filler, the main resin may include an epoxy resin including at least one selected from the group consisting of a glycidyl ether type epoxy resin, a glycidylamine type epoxy resin, a glycidyl ester type epoxy resin, a linear aliphatic type epoxy resin, a rubber-modified epoxy resin, and derivatives thereof.

Specifically, the glycidyl ether type epoxy resin may include glycidyl ether of phenol and glycidyl ether of an alcohol. The glycidyl ether of the phenol may include at least one selected from a bisphenol-based epoxy such as bisphenol type A, bisphenol type B, bisphenol type AD, bisphenol type S, bisphenol type F, or resorcinol, a phenol-based novolac such as phenol novolac epoxy, aralkyl phenol novolac, or terpene phenol novolac, and a cresol novolac-based epoxy resin such as o-cresol novolac epoxy. These may be used alone or in combination of two or more thereof.

The glycidylamine type epoxy resin may include diglycidyl aniline, tetraglycidyl diaminodiphenyl methane, N,N,N',N'-tetraglycidyl-m-xylylenediamine, 1,3-bis(diglycidylaminomethyl)cyclohexane, triglycidyl-m-aminophenol and triglycidyl-p-aminophenol having both structures of glycidyl ether and glycidylamine, or the like. These may be used alone or in combination of two or more thereof.

The glycidyl ester type epoxy resin may include an epoxy resin by a hydroxycarboxylic acid such as a p-hydroxybenzoic acid or a β-hydroxynaphthoic acid, a polycarboxylic acid such as a phthalic acid or a terephthalic acid, or the like. These may be used alone or in combination of two or more thereof.

The linear aliphatic type epoxy resin may include glycidyl ether by 1,4-butanediol, 1,6-hexanediol, neopentyl glycol, cyclohexane dimethanol, glycerin, trimethylol ethane, trimethylol propane, pentaerythritol, dodecahydrobisphenol A, dodecahydrobisphenol F, ethylene glycol, propylene glycol, polyethylene glycol, polypropylene glycol, or the like. These may be used alone or in combination of two or more thereof.

The rubber-modified epoxy resin is not particularly limited as long as its skeleton is an epoxy resin having rubber and/or polyether. In an example, the rubber-modified epoxy resin may be a rubber-modified epoxy resin such as an epoxy resin chemically bonded with a carboxy-modified butadiene-acrylonitrile elastomer in a molecule (CTBN-modified epoxy resin), an acrylonitrile-butadiene rubber-modified epoxy resin (NBR-modified epoxy resin), an urethane-modified epoxy resin, or a silicone-modified epoxy resin. These may be used alone or in combination of two or more thereof.

However, in terms of securing excellent compatibility with an insulating heat radiation filler to be described later, in particular, silicon carbide of the insulating heat radiation filler, improving a heat radiation property, improving durability and surface quality of an insulating heat radiation coating layer, and improving dispersibility of the heat radiation filler, in an example, the main resin may include a compound represented by Formula 1 below:

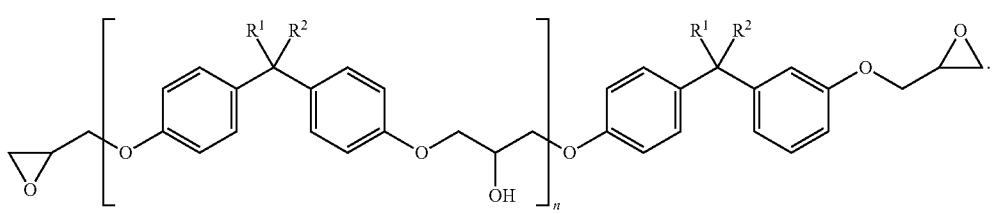

[Formula 1]

$R^1$ and $R^2$ are each independently a hydrogen atom, a $C_1$-$C_5$ linear alkyl group, or a $C_3$-$C_5$ branched alkyl group, and preferably, a hydrogen atom, a $C_1$-$C_3$ linear alkyl group, or a $C_3$-$C_4$ branched alkyl group. $R^3$ and $R^4$ are each independently a hydrogen atom, a $C_1$-$C_5$ linear alkyl group, or a $C_3$-$C_5$ branched alkyl group, and preferably, a hydrogen atom, a $C_1$-$C_3$ linear alkyl group, or a $C_3$-$C_4$ branched alkyl group. N is a rational number which allows a weight average molecular weight of the compound represented by Formula 1 to be in a range of 400 to 4,000, and preferably, in a range of 450 to 3,900.

When the weight average molecular weight of the compound represented by Formula 1 is less than 400, flowability of a coating composition may be increased to make it difficult to form an insulating heat radiation coating layer. Even after the insulating heat radiation coating layer is formed, adhesive strength with respect to a surface to be coated, i.e., a heat radiation base material may be decreased. When the weight average molecular weight exceeds 4,000, it is difficult to prepare an insulating heat radiation coating layer having a uniform thickness. Dispersibility of a heat radiation filler in a coating composition may be decreased to make it difficult to exhibit uniform insulating and heat radiation performance when an insulating heat radiation coating layer is formed.

In addition, a type of the curing agent included in the coating layer-forming component together with the above-described epoxy resin usable as the main resin may be changed according to a specific type of selectable epoxy. A specific type of the curing agent may include a curing agent known in the art, and preferably, may include at least one component selected from an aliphatic polyamine-based curing agent, an aromatic polyamine-based curing agent, an acid anhydride-based curing agent, and a catalyst-based curing agent.

Specifically, the aliphatic polyamine-based curing agent may be, for example, polyethylene polyamine and preferably may include at least one selected from the group consisting of diethylenetriamine (DETA), diethylaminopropylamine (DEAPA), triethylenetetramine (TETA), tetraethylenepentamine (TEPA), and menthanediamine (MDA).

In addition, the aromatic polyamine-based curing agent may include at least one selected from the group consisting of metaphenylenediamine (MPDA), diaminodiphenylsulfone (DDS), and diphenyldiaminomethane (DDM).

Furthermore, the acid anhydride-based curing agent may include, for example, at least one selected from the group consisting of phthalic anhydride (PA), tetrahydrophthalic anhydride (THPA), methyltetrahydrophthalic anhydride (MTHPA), hexahydrophthalic anhydride (HHPA), and methyl nadic anhydride (MNA).

In addition, the catalyst-based curing agent may include, for example, at least one catalyst-based curing agent selected from the group consisting of dicyandiamide (DICY), melamine, polymercaptan, methylenediphenyl diisocyanate (MDI), toluene diisocyanate (TDI), $BF_3$ monoethylamine ($BF_3$-MEA), benzyldimethylamine (BDMA), and phenyl imidazole.

Meanwhile, according to an exemplary embodiment of the present invention, when the main resin includes the compound represented by Formula 1, the coating layer-forming component may include a first curing agent including an aliphatic polyamine-based curing agent as a curing agent and a second curing agent including at least one selected from the group consisting of an aromatic polyamine-based curing agent, an acid anhydride-based curing agent, and a catalyst-based curing agent. As a result, it is very advantageous for improving compatibility with an insulating heat radiation filler to be described below, in particular, silicon carbide, and it is advantageous in all physical properties such as adhesion, durability, and surface quality of an insulating heat radiation coating layer. In addition, even when the heat radiation coating composition is applied to a curved portion or a stepped portion such as a heat radiation fin portion of heat radiation base materials rather than a flat surface, it is advantageous to further prevent cracks and peeling from being generated in the formed insulating heat radiation coating layer. In order to exhibit improved physical properties, the curing agent may include the first curing agent and the second curing agent in a weight ratio of 1:0.5 to 1:1.5, and preferably, in a weight ratio of 1:0.6 to 1:1.4.

When the weight ratio of the first curing agent to the second curing agent is less than 1:0.5, adhesive strength to an adherend may be weakened. When the weight ratio exceeds 1:1.4, elasticity and durability of a coating layer may be decreased.

In addition, the coating layer-forming component may include 25-100 parts by weight of the curing agent, and preferably 40-80 parts by weight of the curing agent with respect to 100 parts by weight of the main resin. When the curing agent is included in an amount less than 25 parts by weight, a resin may be uncured, or durability of the formed insulating heat radiation coating layer may be decreased. In addition, when the curing agent is included in an amount exceeding 100 parts by weight, cracks may be generated in the formed insulating heat radiation coating layer or the insulating heat radiation coating layer may be broken.

Next, the insulating heat radiation filler for improving insulating heat radiation performance will be described.

The insulating heat ration filler may include any material without limitation as long as the material has both of an insulating property and a heat radiation property. In addition, the shape and size of the insulating heat radiation filler are not limited. The insulating heat radiation filler may be porous or non-porous in terms of a structure and may be differently selected according to purpose. In an example, the insulating heat radiation filler may include at least one selected from the group consisting of silicon carbide, magnesium oxide, titanium dioxide, aluminum nitride, silicon nitride, boron nitride, aluminum oxide, silica, zinc oxide, barium titanate, strontium titanate, beryllium oxide, manganese oxide, zirconia oxide, and boron oxide. In terms of facilitating achievement of desired physical properties such as excellent insulating and heat radiation performance, easiness of formation of an insulating heat radiation coating layer, uniform insulating and heat radiation performance after the insulating heat radiation coating layer is formed, and surface quality of the insulating heat radiation coating layer, preferably the insulating heat radiation filler may be silicon carbide.

In addition, a filler, of which a surface is modified by using a functional group such as a silane group, an amino group, an amine group, a hydroxyl group, or a carboxyl group, may be used as the insulating heat radiation filler. In this case, the functional group may be directly bonded to the surface of the filler or may be indirectly bonded to the filler through a $C_1$-$C_{20}$ substituted or unsubstituted aliphatic hydrocarbon or a $C_6$-$C_{14}$ substituted or unsubstituted aromatic hydrocarbon.

In addition, the insulating heat radiation filler may be a core-shell type filler in which a known conductive heat radiation filler such as a carbon or metal-based material is used as a core and an insulating component surrounds the core.

Furthermore, the insulating heat radiation filler may have an average particle diameter of 10 nm to 15 μm, and preferably, an average particle diameter of 30 nm to 12 μm. When the average particle diameter is less than 10 nm, product unit costs may be increased. After the insulating heat radiation filler is formed into an insulating heat radiation coating layer, an amount of the insulating heat radiation filler emerging on a surface of the insulating heat radiation coating layer may be increased, thereby decreasing heat radiation performance. In addition, when the average particle diameter exceeds 15 μm, uniformity of a surface may be decreased.

Meanwhile, a D50 to D97 ratio of the insulating heat radiation filler provided for improving dispersibility of a heat insulating heat radiation filler may be 1:4.5 or less, and preferably, in a range of 1:1.2 to 1:3.5. When the D50 to D97 ratio exceeds 1:4.5, uniformity of a surface may be decreased, and dispersibility of the heat radiation filler is poor. Accordingly, a heat radiation effect may not uniformly appear. Since the insulating heat radiation filler includes particles having relatively large particle diameters, thermal conductivity may be relatively high, but desired heat radiation properties may not be exhibited. D50 and D97 mean particle diameters of the insulating heat radiation filler when cumulative degrees in a volume accumulated particle size distribution are 50% and 97%, respectively. Specifically, in a graph (particle size distribution based on a volume) in which a particle diameter is shown on a horizontal axis and a volume cumulative frequency is shown on a vertical axis from the smallest particle diameter, particle diameters of particles, of which volume cumulative values (%) from the smallest particle diameter are respectively 50% and 97% of a volume cumulative value (100%) of the total particles, correspond to D50 and D97. The volume cumulative particle size distribution of the insulating heat radiation filler may be measured using a laser diffraction scattering particle size distribution device.

On the other hand, the average particle diameter of the insulating heat radiation filler may be changed according to a thickness of an insulating heat radiation coating layer to be formed. In an example, when an insulating heat radiation coating layer having a thickness of 25 μm is formed, a heat radiation filler having an average particle diameter of 1 μm to 7 μm may be used. When an insulating heat radiation coating layer having a thickness of 35 μm is formed, a heat radiation filler having an average particle diameter of 8 μm to 12 μm may be used. However, in order to further improve dispersibility of a heat radiation filler in a composition, an insulating heat radiation filler, which satisfies both the average particle diameter range of the heat radiation filler and the ratio range of D50 to D97 according to the present invention, may be used.

The insulating heat radiation filler may be included in an amount of 25-70 parts by weight, and preferably, in an amount of 35-60 parts by weight in order to exhibit improved physical properties, with respect to 100 parts by weight of the main resin. When the insulating heat radiation filler is included in an amount less than 25 parts by weight with respect to 100 parts by weight of the main resin, desired heat radiation performance may not be exhibited. In addition, when the insulating heat radiation filler is included in an amount exceeding 70 parts by weight, adhesive strength of an implemented insulating heat radiation coating layer may be decreased. Thus, the implemented insulating heat radiation coating layer may be easily peeled off from a heat radiation base material. In addition, hardness of the insulating heat radiation coating layer may be increased, and thus, the insulating heat radiation coating layer may be easily cracked or broken by a physical impact such as vibration of a vehicle. Furthermore, an amount of the heat radiation filler, which protrudes from a surface of the insulating heat radiation coating layer, may be increased to increase surface roughness, resulting in a reduction in surface quality of the insulating heat radiation coating layer. In addition, even when the insulating heat radiation filler is further provided, a degree of improvement in heat radiation performance may be insignificant. Furthermore, in order to implement a thin insulating heat radiation coating layer, in a process of applying a heat radiation coating composition on a surface to be coated, when coating is performed through some coating methods, i.e., a spraying method, it may be difficult to uniformly apply the composition on the surface to be coated. In addition, since dispersibility of a heat radiation filler dispersed in the composition may be decreased, although the composition is applied on the surface to be coated, the heat radiation filler may be nonuniformly dispersed and disposed. Thus, it may be difficult to exhibit uniform insulating and heat radiation performance on an entire surface of the insulating heat radiation coating layer.

Next, a physical property-improving component further included in an insulating heat radiation coating composition will be described.

The physical property-improving component allows a more improved heat radiation property to be exhibited when the insulating heat radiation coating composition is coated on a heat radiation base material and simultaneously allows excellent adhesion to be exhibited, thereby functioning to improve durability.

The physical property-improving component may be a silane-based compound, and known silane-based compounds applied in the art may be used without limitation. However, when the physical property-improving component is used together with the main resin of the above-described coating layer-forming component and silicon carbide of the insulating heat radiation filler, in order to exhibit considerable durability and heat radiation performance by causing synergism of desired physical properties, the physical property-improving component may include at least one selected from the group consisting of 3-[N-anil-N-(2-aminoethyl)] aminopropyltrimethoxysilane, 3-(N-anil-N-glycidyl)aminopropyltrimethoxy silane, 3-(N-anil-N-methacryloyl)aminopropyltrimethoxysilane, 3-glycidyloxypropylmethylethoxysilane, N,N-bis[3-(trimethoxycinyl)propyl]methacrylamide, γ-glycidoxytrimethyldimethoxysilane, 3-glycidyloxypropyltrimethoxysilane, 3-glycidyloxypropyltriethoxysilane, 3-glycidyloxypropylmethylmethoxysilane, beta(3,4-epoxycyclohexyl)ethyltrimethoxysilane, 3-methacryloxypropyltrimethoxysilane, 3-glycidyloxypropylmethyldimethoxysilane, heptadecafluorodecyltrimethoxysilane, 3-methacryloxypropylmethyldimethoxysilane, 3-methacryloxypropyltris(trimethylsiloxy)silane, methyltris(dimethylsiloxy)silane, 3-aminopropyltriepoxysilane, 3-mercaptopropyltrimethoxysilane, and N-(β-aminoethyl)-γ-aminopropyltrimethoxysilane.

In addition, the physical property-improving component may be included in an amount of 0.5-20 parts by weight with respect to 100 parts by weight of the main resin. When the physical property-improving component is included in an amount less than 0.5 parts by weight, desired physical properties such as heat radiation performance and adhesion may not be achieved concurrently to a desired level through the physical property-improving component. Furthermore, when the physical property-improving component is included in an amount exceeding 20 parts by weight, an adhesive force of the physical property-improving component to a heat radiation base material may be weakened.

On the other hand, the above-described insulating heat radiation coating composition may further include a colorant for minimizing a loss of color due to light, air, moisture, or extreme temperature, and a quencher for eliminating gloss so as to exhibit stability of a coating film surface. The colorant may include at least one selected from the group consisting of talc, zinc oxide, zinc sulfide, a metal oxide, hydroxyl, sulfide, azo, nitro, and phthalocyanine, and preferably, may include talc. The colorant may be included in an amount of 30-60 parts by weight, and preferably, in an amount of 35-55 parts by weight with respect to 100 parts by weight of the main resin, but the present invention is not limited thereto. In addition, the quencher may include at least one selected from the group consisting of titanium dioxide, aerogel silica, hydrogel silica, polypropylene wax (PP wax), polyethylene wax (PE wax), polytetrafluoroethylene wax (PTFE wax), an urea formaldehyde resin, and a benzoguanamine formaldehyde resin, and preferably, may include titanium dioxide. In addition, the quencher may be included in an amount of 30-60 parts by weight, and preferably, in an amount of 35-55 parts by weight with respect to 100 parts by weight of the main resin, but the present invention is not limited thereto. Talc usable as the colorant and titanium dioxide usable as the quencher may also be used as a filler together with the insulating heat radiation filler to improve a withstand voltage property.

Meanwhile, the above-described insulating heat radiation coating composition may further include a flame retardant to improve flame retardancy of the insulating heat radiation coating layer. The flame retardant may include a known component used as a flame retardant in the art. In an example, the flame retardant may include at least one selected from the group consisting of trizinc bis(orthophosphate), tryphenyl phosphate, trixylenyl phosphate, tricresyl phosphate, triisophenyl phosphate, tris-chloroethyl phosphate, tris-chloropropyl phosphate, resorcinol di-phosphate, aromatic polyphosphate, polyphosphoric acid ammonium, and red phosphorous. In addition, the flame retardant may be included in an amount of 10-35 parts by weight, and preferably, in an amount of 15-30 parts by weight with respect to 100 parts by weight of the main resin.

Meanwhile, the above-described insulating heat radiation coating composition may further include a dispersant and a solvent, which are used to improve dispersibility of an insulating heat radiation filler and implement a uniform insulating heat radiation coating layer. The dispersant may include a known component used as a dispersant of an insulating heat radiation filler in the art. In an example, the dispersant may include at least one selected from a silicon-based dispersant, a polyester-based dispersant, a polyphenylene ether-based dispersant, a polyolefin-based dispersant, an acrylonitrile-butadiene-styrene copolymer dispersant, a polyarylate-based dispersant, a polyamide-based dispersant, a polyamide imide-based dispersant, a polyaryl sulfone-based dispersant, a polyether imide-based dispersant, a polyether sulfone-based dispersant, a polyphenylene sulfide-based dispersant, a polyimide-based dispersant, a polyether ketone-based dispersant, a poly benzoxazol-based dispersant, a poly oxadiazole-based dispersant, a poly benzothiazole-based dispersant, a poly benzimidazole-based dispersant, a polypyridine-based dispersant, a polytriazole-based dispersant, a polypyrrolidine-based dispersant, a poly dibenzofuran-based dispersant, a polysulfone-based dispersant, a polyurea-based dispersant, a polyurethane-based dispersant, a polyphosphazene-based dispersant, and the like. These may be used alone or in the form of a mixture or copolymer of two or more selected therefrom. Furthermore, in an example, the dispersant may be a silicon-based dispersant. In addition, the dispersant may be included in an amount of 0.5-20 parts by weight with respect to 100 parts by weight of the insulating heat radiation filler. When the dispersant is included in an amount less than 0.5 parts by weight with respect to 100 parts by weight of the insulating heat radiation filler, a desired effect may not be exhibited. When the dispersant is included in an amount exceeding 20 parts by weight, adhesive strength of an adherend may be weakened, or pin holes and orange peels may occur on a coating film surface.

In addition, the solvent may be appropriately selected according to a selected main resin, curing agent, or the like, but the present disclosure is not particularly limited thereto. The solvent may include any solvent capable of appropriately dissolving each component. For example, the solvent may include at least one selected from the group consisting of an aqueous solvent such as water, an alcohol-based solvent, a ketone-based solvent, an amine-based solvent, an amine-based solvent, an ester-based solvent, an amide-based solvent, a halogenated hydrocarbon-based solvent, an ether-based solvent, and a furan-based solvent.

On the other hand, the above-described insulating heat radiation coating composition may further include a UV (ultraviolet) stabilizer for preventing yellowing by a UV ray. The UV stabilizer may include a known component used as a UV stabilizer of an insulating heat radiation coating composition in the art. In an example, the UV stabilizer may include at least one selected from the group consisting of 2-(2'-hydroxy-3,5'-di(1,1-dimethylbenzyl-phenyl)-benzotriazole, 2-(2'-hydroxy-3',5'-di-tert-butylphenyl)-benzotriazole, 2-(2'-hydroxy-3'-tert-butyl-5'-methylphenyl)-5-chlorobenzotriazole, 2-(2-hydroxy-5-tert-octylphenyl)-benzotriazole, 2-(5-methyl-2-hydroxyphenyl)-benzotriazole, 2,6-di-t-butyl-4-methylphenol, tetrakis[methylene-3(3,5-di-t-butyl-4-hydroxyphenyl)propionate]methane, octadecyl-3,5-di-t-butyl-4-hydroxyhydrocinnamate, 2,2'-methylenebis(4-methyl-6-t-butylphenol), tris(2,4-di-t-butylphenyl)-phosphite, bis(2,4-di-t-butyl), pentaerythritol-di-phosphite alkyl ester phosphite, dilauryl thio-di-propionate, distearyl thio-di-propionate, distearyl thio-di-propionate, and dimyristyl thio-di-propionate. In addition, in an example, the UV stabilizer may be 2-(2'-hydroxy-3,5'-di(1,1-dimethylbenzyl-phenyl)-benzotriazole.

In addition, the UV stabilizer may be further included in an amount of 0.05-2 parts by weight with respect to 100 parts by weight of the main resin. When the UV stabilizer is included in an amount less than 0.05 part by weight with respect to 100 parts by weight of the main resin, a desired effect may not be exhibited. When the UV stabilizer is included in an amount exceeding 2 parts by weight, adhesive strength and impact resistance of an insulating heat radiation layer may be decreased.

Meanwhile, the above-described insulating heat radiation coating composition may further include an antioxidant for preventing discoloration of a coating dry film, embrittlement due to oxidation, and a reduction in physical properties such as adhesive strength.

The antioxidant may include a known component used as an antioxidant of an insulating heat radiation coating composition in the art. In an example, the antioxidant may include at least one selected from the group consisting of trimethyl phosphate, triphenyl phosphate, tris(2,4-di-tert-butylphenyl)phosphate, triethylene glycol-bis-3-(3-tert-butyl-4-hydroxy-5-methylphenyl)propionate, 1,6-hexanediol[3-(3,5-di-tert-butyl-4-hydroxyphenyl)propionate], pentaerythritol-tetrakis(3-(3,5-di-tert-butyl-4-hydroxyphenyl)propionate, 2-hydroxybenzophenone, 2-hydroxyphenyl benzothiazole, a hindered amine, an organic nickel compound, a salicylic acid salt, a cinnamate derivative, resorcinol monobenzoate, oxanilide, and p-hydroxybenzoate. In addition, in an example, the antioxidant may be 2-hydroxyphenyl benzothiazole.

Furthermore, the antioxidant may be further included in an amount of 0.1-3 parts by weight with respect to 100 parts by weight of the main resin. When the antioxidant is included in an amount less than 0.1 part by weight with respect to 100 parts by weight of the main resin, discoloration may occur. When the antioxidant is included in an amount exceeding 3 parts by weight, brittleness may be increased, and adhesive strength may be decreased.

In addition, the above-described insulating heat radiation coating composition may include at least one type selected from various additives such as a leveling agent, a pH adjusting agent, an ion trapping agent, a viscosity modifier, a thixotropic agent, a heat stabilizer, an ultraviolet absorber, a dehydrating agent, an antistatic agent, an antifungal agent, and a preservative. The above-described various additives may be those well known in the art and are not particularly limited in the present invention.

The above-described insulating heat radiation composition may have a viscosity of 5 cps to 600 cps at temperature of 25° C. When the viscosity of the insulating heat radiation composition is less than 5 cps, the formation of an insulating heat radiation coating layer may be difficult due to a downflow of the composition and even after the insulating heat radiation coating layer is formed, adhesive strength with respect to a heat radiation base material may be decreased. When the viscosity of the insulating heat radiation composition exceeds 600 cps, it is difficult to prepare a thin insulating heat radiation coating layer and although the thin insulating heat radiation coating layer is prepared, a surface of the thin insulating heat radiation coating layer may not be uniform, and a coating process may not be easy. In particular, a coating process may be further difficult in the case of spray coating. Furthermore, dispersibility of an insulating heat radiation filler in the insulating heat radiation coating layer may be decreased.

On the other hand, a heat radiation part, which includes a 25 μm thick-insulating heat radiation coating layer cured by treating the insulating heat radiation coating composition on an aluminum plate having a thickness of 1.5 mm and an area of 35-by-34-mm, may satisfy the following condition (1).

Condition (1) may be as follows: a heat source may be placed in a center of a lower portion of the heat radiation part in a closed system having a temperature of 25° C. and a humidity of 50%, and after 90 minutes, a temperature may be measured at each of any 10 points on a 15-mm radius circle centered on a center of an upper surface of the heat radiation part, and an error of temperature calculated according to the following Expression 1 may be within ±1% at each point.

error (%) of temperature=((average temperature (° C.) of any 10 points)−(temperature (° C.) at each point))/(average temperature (° C.) of any 10 points) [Expression 1]

As the error of the temperature calculated according to Expression 1 approaches 0% at each point, it means that since a heat radiation filler is uniformly dispersed, a heat radiation property of the prepared heat radiation part uniformly appears.

Since dispersibility of a heat radiation filler is increased, an insulating heat radiation coating composition capable of implementing an insulating heat radiation coating layer satisfying condition (1) may allow the heat radiation part including the insulating heat radiation coating layer to exhibit uniform heat radiation performance regardless of positions of the heat radiation part.

On the other hand, a heat radiation part, which includes a 25 μm thick-insulating heat radiation coating layer cured by treating the insulating heat radiation coating composition on an aluminum plate having a thickness of 1.5 mm and an area of 35-by-34-mm, may satisfy the following condition (2).

Condition (2) may be as follows: a heat source having a temperature of 88° C. may be placed in a center of a lower portion of the heat radiation part in a closed system having a temperature of 25° C. and a humidity of 50%, and after 90 minutes, a temperature may be measured at an upper point located 5 cm from a center of the heat radiation part, and heat radiation efficiency calculated according to the following Expression 3 may be 10% or more, and preferably, in a range of 10% to 100%.

heat radiation efficiency (%)={(temperature (° C.) of upper point located 5 cm from center of heat radiation part÷temperature (° C.) of upper point 5 cm from center of uncoated heat radiation part)−1}×100 [Expression 3]

High heat radiation efficiency calculated according to Expression 3 may mean that heat radiation performance is excellent among heat radiation properties and thus heat is rapidly radiated into air. Since condition (2) is satisfied, the heat radiation part, which includes the insulating heat radiation coating layer cured by treating the insulating heat radiation coating composition, may exhibit excellent heat radiation properties, in particular, a heat emission property.

The heat source used for measuring the performance of the insulating heat radiation coating layer in conditions (1) and (2) may include any heat source without limitation as long as the heat source has a temperature exceeding 25° C. and maintains a constant temperature. In an example, the heat source may be an LED having a certain power consumption.

The insulating heat radiation coating composition may be treated and cured on an outer surface of a heat radiation base material of a heat radiation part. A specific treatment method may be selected from known methods of coating a base material with a coating composition. The insulating heat radiation coating composition may be treated and prepared on various base materials by using various methods such as a spraying method, a dip coating method, a silk screen method, a roll coating method, a deposition coating method, and a spin coating method, as non-limiting examples of the specific treatment method.

After the insulating heat radiation coating composition is treated, a curing method thereof may be changed according to types of a main resin and a curing agent of a coating layer-forming component. In an example, the insulating heat radiation coating composition may be treated by applying heat and/or light. A temperature of the applied heat and/or intensity of the applied light, and a treatment time may be changed according to a type of a used main resin, a type of a used curing agent, contents of the main resin and the curing agent, a thickness of a coating film, and the like. In an example, an insulating heat radiation coating composition, which includes the above-described epoxy resin as a main resin, a first curing agent including an aliphatic polyamine-based curing agent, and a second curing agent including at least one selected from an aromatic polyamine-based curing agent, an acid anhydride-based curing agent, and a catalyst-based curing agent, may be cured at a temperature of 130° C. to 150° C. for 1 minute to 60 minutes. When a treatment temperature is less than 130° C. and/or a treatment time is less than 1 minute, it may be difficult for the insulating heat radiation coating composition to be coated on a heat radiation base material. When a treatment temperature exceeds 150° C. and/or a treatment time exceeds 60 minutes, the heat radiation base material may be deformed, or manufacturing costs may be increased.

In addition, since the above-described insulating heat radiation coating composition may come into contact with a metal base material and may then be exposed to air to form a film which is rapidly cured at room temperature or at a temperature of 50° C. or less within several minutes without sticking, the insulating heat radiation coating composition may be unlikely to be contaminated by dust or the like in a work place, and final curing thereof may be performed at a relatively low temperature. Accordingly, the insulating heat radiation coating composition may have excellent workability and may prevent deformation of the metal base material during curing thereof.

An insulating heat radiation coating layer made of the above-described insulating heat radiation coating composition may have a thickness of 15 μm to 50 μm, and more preferably, a thickness of 15 μm to 45 μm. When the thickness of the insulating heat radiation coating layer exceeds 50 μm, a boiling phenomenon may occur on a coating surface. When the thickness of the insulating heat radiation coating layer is less than 15 μm, heat radiation properties may be decreased.

In addition, the implemented insulating heat radiation coating layer may include 10 wt % to 30 wt % of an insulating heat radiation filler, and preferably, 15 wt % to 25 wt % of the insulating heat radiation filler with respect to the total weight of the insulating heat radiation coating layer. When the insulating heat radiation filler is included in an amount less than 10 wt % in the implemented insulating heat radiation coating layer, heat radiation performance may not be achieved to a desired level. In addition, when the insulating heat radiation filler is included in an amount exceeding 30 wt %, an adhesive force of the insulating heat radiation coating layer may be weakened and thus may be easily peeled off. In addition, hardness of the insulating heat radiation coating layer may be increased, and thus, the insulating heat radiation coating layer may be easily cracked or broken by a physical impact. Furthermore, since an amount of the insulating heat radiation filler, which protrudes from a surface of the insulating heat radiation coating layer, is increased, surface roughness may be increased to decrease surface quality of the insulating heat radiation coating layer. In addition, even if the insulating heat radiation filler is further provided, a degree of improvement in heat radiation performance may be insignificant.

In addition, a heat radiation part, on which the insulating heat radiation coating layer of the present invention is formed, may have a sheet resistance value of $10^{10}$ Ω/sq to $10^{14}$ Ω/sq. When the sheet resistance value of the heat radiation part is less than $10^{10}$ Ω/sq, an insulating property of the heat radiation part is not good. Thus, electrical reliability may not be secured.

On the other hand, a relative gain of thermal conductivity according to the following Expression 2 of the insulating heat radiation coating layer provided in the heat radiation part may be 200%, and preferably, may exceed 220%.

relative gain (%)={(thermal conductivity ($Wm^{-1}K^{-1}$) of insulating heat radiation coating layer)−(thermal conductivity ($Wm^{-1}K^{-1}$) of coating layer not including heat radiation filler)}×100/(thermal conductivity ($Wm^{-1}K^{-1}$) of coating layer not including heat radiation filler) [Expression 2]

A low relative gain of the thermal conductivity means that an insulating heat radiation coating layer including a heat radiation filler has less improvement in thermal conductivity as compared with a coating layer not including a heat radiation filler. A high relative gain of the thermal conductivity means that an insulating heat radiation coating layer including a heat radiation filler has higher improvement in thermal conductivity as compared with a coating layer not including a heat radiation filler.

When a relative gain of the thermal conductivity is 200% or less, heat radiation performance may not be achieved to a desired level, and in particular, heat emission performance may not be exhibited.

Figure 4:
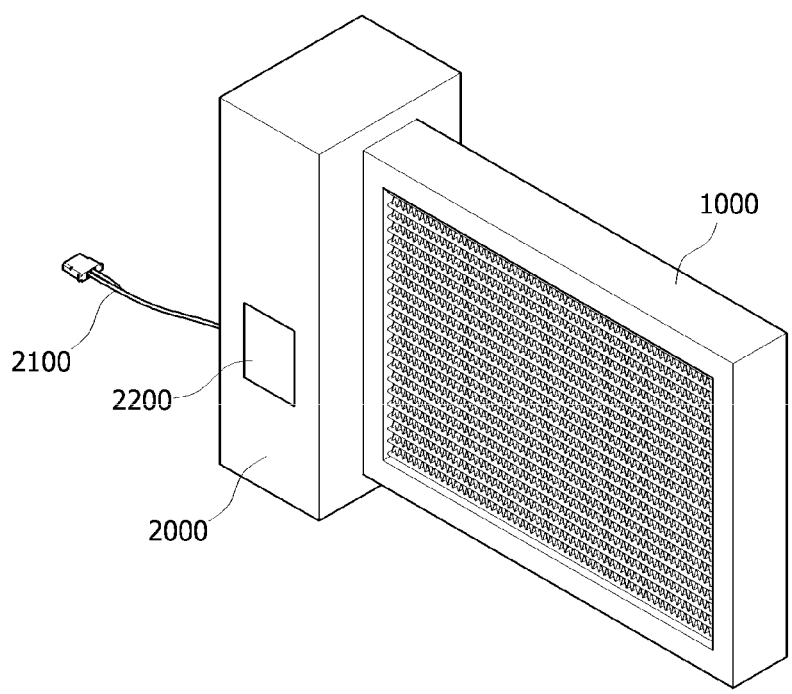
FIG. 4 is a perspective view illustrating a PTC heater according to an exemplary embodiment of the present invention.

As shown in FIG. 4, the present invention implements a PTC heater for a vehicle, which includes a PTC module 1000 including the plurality of PTC units according to the present invention, and a circuit module 2000 electrically connected to the PTC module.

The circuit module 2000 may be a control circuit configured to control a current applied to PTC elements and may include a power input unit 2100 through which a current flows into the PTC heater, and a PTC control terminal 2200 configured to control the PTC heater. The circuit module 2000 may be a known control circuit provided in a PTC heater for a vehicle. A module including the control circuit module may be selected and used without limitation. Thus, the present invention is not particularly limited thereto, and a detailed description thereof will be omitted.

In addition, the present invention may be implement into an air conditioning device for a vehicle, which includes a blowing device configured to blow air toward the PTC heater, and the PTC heater according to present invention configured to heat air blown from the blowing device.

The blowing device may include a fan and a driver configured to drive the fan. The blowing device may include a known element provided in a vehicle, and the present invention is not particularly limited thereto.

MODE FOR INVENTION

The present invention will be described in more detail through the following examples, however, the following examples do not limit the scope of the present invention, and it should be understood that the following examples are intended to assist the understanding of the present invention.

Example 1

First, in order to prepare an insulating heat radiation coating composition, a coating layer-forming component was prepared as follows: 60 parts by weight of a curing agent including a polyethylene polyamine as a first curing agent and 2,4,6-tris[N,N-dimethylamino]methyl]phenol as a second curing agent in a weight ratio of 1:1, 47 parts by weight of silicon carbide having an average particle diameter of 5 μm and a D50 to D97 ratio of 1:1.6, 3 parts by weight of an epoxy-based silane compound as a physical property-improving component (Tech-7130 manufactured by Shanghai Tech Polymer Technology), 44 parts by weight of talc as a colorant, 44 parts by weight of titanium dioxide as a quencher, 22 parts by weight of trizinc bis(orthophosphate) as a flame retardant, 0.5 part by weight of 2-(2'-hydroxy-3,5'-di(1,1-dimethylbenzyl-phenyl)-benzotriazole as a UV stabilizer, 1 part by weight of 2-hydroxyphenyl benzothiazole as an antioxidant, 5 parts by weight of a condensate of isobutylaldehyde and urea as a dispersant, and solvents, i.e., 13 parts by weight of 1-butanol, 13 parts by weight of n-butyl acetate, 13 parts by weight of 2-methoxy-1-methylethyl acetate, 9 parts by weight of methyl ethyl ketone, 37 parts by weight of ethyl acetate, 9 parts by weight of toluene, 43 parts by weight of 4-methyl-2-pentanone, and 103 parts by weight of xylene were mixed and stirred with respect to 100 parts by weight of a main resin, i.e., a compound represented by Formula 1 below. After the stirring, bubbles included in the resultant mixture were removed, and final viscosity was adjusted to 100 cps to 130 cps at a temperature of 25° C. to prepare the insulating heat radiation coating composition as shown in Table 1 below. Then, the insulating heat radiation coating composition was stored at a temperature of 5° C.

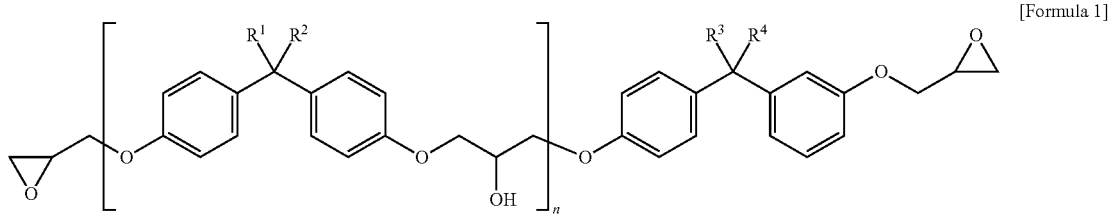

[Formula 1]

Each of $R^1$ to $R^4$ is a methyl group, and n is a rational number which allows a weight average molecular weight of the compound represented by Formula 1 to be 2,000.

The prepared insulation heat radiation coating composition was spray-coated on an entire surface of a heat radiation base material including an aluminum material (Al 1050) with a thickness of 1.5 mm and an area of 35-by-34-mm to a final thickness of 25 μm, and then, was heat-treated at a temperature of 150° C. for 10 minutes to prepare a heat radiation part on which an insulating heat radiation coating layer is formed. The heat radiation part was assembled with a heat generation part including known PTC elements for a vehicle as shown in FIG. 2B to manufacture a PTC unit for a vehicle heater.

Examples 2 to 23

Insulating heat radiation compositions were prepared in the same manner as in Example 1, except that an average particle diameter and a particle size distribution of an insulating heat radiation filler, a weight ratio of curing agents, a molecular weight of a main resin, and the like were changed as shown in Table 1, Table 2, Table 3, and Table 4. Heat radiation parts were prepared by using the insulating heat radiation compositions. PTC units for a vehicle heater as shown in Table 1, Table 2, Table 3, and Table 4 were manufactured using the heat radiation parts.

Comparative Example 1

A heat radiation part including a coating layer was prepared in the same manner as in Example 1, except that the coating layer does not include an insulating heat radiation filler as shown in Table 4. A PTC unit for a vehicle heater as shown in Table 4 was manufactured using the heat radiation part.

Experimental Example 1

The following physical properties of heat radiation parts of the PTC units for the vehicle heater manufactured in Examples and Comparative Example were evaluated and shown in Tables 1 to 4.
1. Evaluation of Thermal Conductivity
A heat radiation part was placed at a center of a 32-by-30-by-30-cm acrylic chamber, and then, a temperature inside the chamber and a temperature of the heat radiation part were adjusted to 25±0.2° C. Then, a 20-by-20-mm light-emitting diode (LED) as a heat source was attached to the heat radiation part by using a thermal conductive tape (TIM: 1 W/mk) to prepare a test specimen. Input power of 2.1 W (DC 3.9 V and 0.53 A) was applied to the heat source of the prepared test specimen to generate heat. After the test specimen was maintained for 90 minutes, a temperature of the heat radiation part was measured to evaluate thermal conductivity of the heat radiation part. Specifically, thermal conductivity of a heat radiation base material not including a heat radiation coating layer was calculated according to Expression 4 below based on a temperature measured under the same conditions.

thermal conductivity (%)={1−(temperature (° C.) of test specimen÷temperature (° C.) of uncoated base material)}×100   [Expression 4]

2. Evaluation of Heat Radiation Performance

A heat radiation part was placed at a center of a 32-by-30-by-30-cm acrylic chamber, and a temperature inside the chamber and a temperature of the heat radiation part were adjusted to 25±0.2° C. Then, a 20-by-20-mm LED as a heat source was attached to the heat radiation part by using a thermal conductive tape (TIM: 1 W/mk) to prepare a test specimen. Input power of 2.1 W (DC 3.9 V and 0.53 A) was applied to the heat source of the prepared test specimen to generate heat. After the test specimen was maintained for 90 minutes, a temperature of an upper point located 5 cm from a center of the heat radiation part was measured to evaluate heat emissivity of the heat radiation part. Specifically, heat emissivity of a heat radiation base material not including a heat radiation coating layer was calculated according to Expression 3 below based on a temperature measured under the same conditions.

heat radiation efficiency (%)={(temperature (° C.) of upper point located 5 cm from center of heat radiation part)÷(temperature (° C.) of upper point located 5 cm from center of uncoated heat radiation part)−1}×100   [Expression 3]

3. Uniformity Evaluation of Heat Radiation Performance

A heat radiation part was placed at a center of a 32-by-30-by-30-cm acrylic chamber, and a temperature inside the chamber and a temperature of the heat radiation part were adjusted to 25±0.2° C. Humidity inside the chamber was adjusted to 50%. Then, a 20-by-20-mm LED as a heat source was attached to the heat radiation part by using a thermal conductive tape (TIM: 1 W/mk) to prepare a test specimen. Input power of 2.1 W (DC 3.9 V and 0.53 A) was applied to the heat source of the prepared test specimen to generate heat. After the test specimen was maintained for 90 minutes, a temperature was measured at each of any 10 points on a 15-mm radius circle centered on a center of an upper surface of the heat radiation part, and an error of the temperature was calculated according to Expression 1 below. As an error becomes smaller, it can be considered that heat radiation performance is uniform, and it can be interpreted that dispersibility of a heat radiation filler of an insulating heat radiation coating layer is high. A maximum value of errors of a temperature was shown in Tables 1 to 4 below.

error (%) of temperature=[(average temperature (° C.) of any 10 points)−(temperature (° C.) of each point)]×100÷(average temperature (° C.) of any 10 points)   [Expression 1]

4. Evaluation of Durability

A heat radiation part was placed in a chamber having a temperature of 60° C. and a relative humidity of 90%, and then, after 480 hours, a surface state of the heat radiation part was visually evaluated. As a result of evaluation, the presence or absence of cracking and peeling (lifting) of an insulating heat radiation coating layer was confirmed. When there was no abnormality, it was indicated as O, and when there was an abnormality, it was indicated as X.

5. Evaluation of Adhesiveness

A test specimen, on which durability was evaluated, was cross-cut at intervals of 1 mm by using a knife. After that, a scotch tape was attached to a cut surface and was pulled at an angle of 60° to check a state in which an insulating heat radiation coating layer was peeled off. Evaluation was performed according to an evaluation criterion, i.e., ISO 2409. (5B: 0%, 4B: 5% or less, 3B: 5-15%, 2B: 15-35%, 1B: 35-65%, and 0B: greater than 65%)

6. Evaluation of Surface Quality

In order to confirm a surface quality of a heat radiation part, it was checked whether a surface was uneven or rough by touching the surface with a hand. When there was a smooth feeling, it was indicated as 5. When an area of a rough portion was less than 2% of the total area of an outer surface of a heat radiation part, it was denoted as 4. When the area of the rough portion was greater than 2% and 5% or less of the total area, it was denoted as 3. When the area of the rough portion was greater than 5% and 10% or less of the total area, it was denoted as 2. When the area of the rough portion was greater than 10% and 20% or less of the total area, it was denoted as 1, When the area of the rough portion was greater than 20% of the total area, it was denoted as 0.

TABLE 1

| | Category | Example 1 | Example 2 | Example 3 | Example 4 | Example 5 | Example 6 | Example 7 |
|---|---|---|---|---|---|---|---|---|
| Coating layer-forming component | Main resin (weight average molecular weight) | 2,000 | 2,000 | 2,000 | 310 | 570 | 3,900 | 4,650 |
| | Content of curing agent (parts by weight) | 60 | 60 | 60 | 60 | 60 | 60 | 60 |
| | Weight ratio of first curing agent and second curing agent | 1:1 | 1:1 | 1:1 | 1:1 | 1:1 | 1:1 | 1:1 |
| Insulating heat radiation | Content (parts by weight) | 47 | 35 | 60 | 47 | 47 | 47 | 47 |

TABLE 1-continued

| | Category | Example 1 | Example 2 | Example 3 | Example 4 | Example 5 | Example 6 | Example 7 |
|---|---|---|---|---|---|---|---|---|
| filler | Average particle diameter (μm) | 5 | 5 | 5 | 5 | 5 | 5 | 5 |
| | Ratio of D50 to D97 | 1:1.6 | 1:1.6 | 1:1.6 | 1:1.6 | 1:1.6 | 1:1.6 | 1:1.6 |
| Heat radiation part | Thickness (μm) of insulating heat radiation coating layer | 25 | 25 | 25 | 25 | 25 | 25 | 25 |
| | Thermal conductivity (%) | 18.27 | 17.65 | 18.34 | 16.91 | 17.02 | 17.13 | 16.54 |
| | Heat radiation efficiency (%) | 90 | 81 | 96 | 86 | 88 | 88 | 87 |
| | Error (%) of temperature | 0.5 | 0.6 | 0.4 | 0.3 | 0.4 | 0.9 | 4.1 |
| | Adhesiveness | 5B | 5B | 5B | 0B | 4B | 5B | 5B |
| | Durability | ○ | ○ | ○ | x | ○ | ○ | ○ |
| | Surface quality | 5 | 5 | 5 | 5 | 5 | 5 | 5 |

TABLE 2

| | Category | Example 8 | Example 9 | Example 10 | Example 11 | Example 12 | Example 13 | Example 14 |
|---|---|---|---|---|---|---|---|---|
| Coating layer-forming component | Main resin (weight average molecular weight) | 2,000 | 2,000 | 2,000 | 2,000 | 2,000 | 2,000 | 2,000 |
| | Content of curing agent (parts by weight) | 15 | 30 | 95 | 110 | 60 | 60 | 60 |
| | Weight ratio of first curing agent and second curing agent | 1:1 | 1:1 | 1:1 | 1:1 | 1:0.2 | 1:0.6 | 1:1.4 |
| Insulating heat radiation filler | Content (parts by weight) | 47 | 47 | 47 | 47 | 47 | 47 | 47 |
| | Average particle diameter (μm) | 5 | 5 | 5 | 5 | 5 | 5 | 5 |
| | Ratio of D50 to D97 | 1:1.6 | 1:1.6 | 1:1.6 | 1:1.6 | 1:1.6 | 1:1.6 | 1:1.6 |
| Heat radiation part | Thickness (μm) of insulating heat radiation coating layer | 25 | 25 | 25 | 25 | 25 | 25 | 25 |
| | Thermal conductivity (%) | 16.22 | 17.39 | 17.12 | 14.59 | 16.94 | 17.72 | 17.63 |
| | Heat radiation efficiency (%) | 88 | 88 | 87 | 87 | 86 | 88 | 89 |
| | Error (%) of temperature | 0.5 | 0.5 | 0.5 | 0.5 | 0.4 | 0.5 | 0.5 |
| | Adhesiveness | 0B | 4B | 4B | 2B | 0B | 5B | 5B |
| | Durability | x | ○ | ○ | x | x | ○ | ○ |
| | Surface quality | 2 | 5 | 5 | 1 | 5 | 5 | 5 |

TABLE 3

| | Category | Example 15 | Example 16 | Example 17 | Example 18 | Example 19 | Example 20 | Example 21 |
|---|---|---|---|---|---|---|---|---|
| Coating layer-forming component | Main resin (weight average molecular weight) | 2,000 | 2,000 | 2,000 | 2,000 | 2,000 | 2,000 | 2,000 |
| | Content of curing agent (parts by weight) | 60 | 60 | 60 | 60 | 60 | 60 | 60 |
| | Weight ratio of first curing agent and second curing agent | 1:2 | 1:1 | 1:1 | 1:1 | 1:1 | 1:1 | 1:1 |
| Insulating heat radiation filler | Content (parts by weight) | 47 | 47 | 47 | 47 | 47 | 47 | 47 |
| | Average particle diameter (μm) | 5 | 0.005 | 0.42 | 10 | 20 | 3 | 5 |
| | Ratio of D50 to D97 | 1:1.6 | 1:2.41 | 1:2.08 | 1:1.51 | 1:1.93 | 1:3.08 | 1:4.96 |
| Heat radiation | Thickness (μm) of insulating heat | 25 | 25 | 25 | 25 | 25 | 25 | 25 |

TABLE 3-continued

| Category | | Example 15 | Example 16 | Example 17 | Example 18 | Example 19 | Example 20 | Example 21 |
|---|---|---|---|---|---|---|---|---|
| part | radiation coating layer | | | | | | | |
| | Thermal conductivity (%) | 17.01 | 12.11 | 17.63 | 17.92 | 17.19 | 17.88 | 18.31 |
| | Heat radiation efficiency (%) | 88 | 7 | 88 | 91 | 90 | 81 | 39 |
| | Error (%) of temperature | 0.5 | 0.5 | 0.5 | 0.4 | 2.8 | 0.8 | 3.9 |
| | Adhesiveness | 2B | 3B | 5B | 5B | 3B | 4B | 2B |
| | Durability | x | ○ | ○ | ○ | ○ | ○ | ○ |
| | Surface quality | 5 | 5 | 5 | 4 | 0 | 4 | 3 |

TABLE 4

| Category | | Comparative Example 1 | Comparative Example 2 | Comparative Example 3 |
|---|---|---|---|---|
| Coating layer-forming component | Main resin (weight average molecular weight) | 2,000 | 2,000 | 2,000 |
| | Content of curing agent(parts by weight) | 60 | 60 | 60 |
| | Weight ratio of first curing agent and second curing agent | 1:1 | 1:1 | 1:1 |
| Insulating heat radiation filler | Content (parts by weight) | 15 | 80 | — |
| | Average particle diameter (μm) | 5 | 5 | — |
| | Ratio of D50 to D97 | 1:1.6 | 1:1.6 | — |
| Heat radiation part | Thickness (μm) of insulating heat radiation coating layer | 25 | 25 | 25 |
| | Thermal conductivity (%) | 14.62 | 18.36 | 4.76 |
| | Heat radiation efficiency (%) | 8 | 98 | 2 |
| | Error (%) of temperature | 5.3 | 1.0 | 0 |
| | Adhesiveness | 5B | 3.8 | 5B |
| | Durability | ○ | x | ○ |
| | Surface quality | 5 | 1 | 5 |

1) Comparative Example 3 shows a composition which does not include a heat radiation filler.

As can be seen from Tables 1 to 4 above, it can be confirmed that Examples 1, 5, and 6, in which a weight average molecular weight of a main resin in the insulating heat radiation coating composition is within a preferred range of the present invention, concurrently achieve adhesiveness, durability, and uniformity of heat radiation performance compared with Examples 4 and 7 which do not satisfy the preferred range.

In addition, it can be confirmed that Examples 1, 9, and 10, in which a content of a curing agent is within a preferred range of the present invention, concurrently achieve thermal conductivity, durability, and adhesiveness compared with Examples 8 and 11 which do not satisfy the preferred range.

Furthermore, it can be confirmed that Examples 1, 13, and 14, in which a weight ratio of a first curing agent and a second curing agent is within a preferred range of the present invention, concurrently achieve adhesiveness and durability compared with Examples 12 and 15 which do not satisfy the preferred range.

In addition, it can be confirmed that Examples 1, 17, and 18, in which an average particle diameter of an insulating heat radiation filler is within a preferred range of the present invention, concurrently achieve heat radiation efficiency, thermal conductivity, and surface quality compared with Examples 16 and 19 which do not satisfy the preferred range.

Furthermore, it can be confirmed that Examples 1 and 20, in which a D50 to D97 ratio is within a preferred range of the present invention, concurrently achieve dispersibility, surface quality, heat radiation efficiency, and adhesiveness compared with Example 21 which does not satisfy the preferred range.

In addition, it can be confirmed that Examples 1, 2, and 3, in which a content of a heat radiation filler is within a preferred range of the present invention, concurrently have considerably excellent heat radiation performance and surface quality compared with Examples 22 and 23 which do not satisfy the preferred range.

Furthermore, it can be confirmed that Comparative Example 1 not including a heat radiation filler has considerably low heat radiation performance compared with Example 1.

Experimental Example 2

Relative gain evaluation of thermal conductivity was performed on heat radiation parts of the PTC units for a vehicle heater manufactured in Example 1 and Comparative Example 1. Specifically, thermal conductivity was measured through a steady state heat flow method, and a relative gain of the thermal conductivity of the heat radiation part of Example 1 was evaluated according to the following Expression 2. Evaluation results are shown in Table 5.

relative gain (%)={(thermal conductivity ($Wm^{-1}K^{-1}$) of insulating heat radiation coating layer−thermal conductivity ($Wm^{-1}K^{-1}$) of coating layer not including heat radiation filler)×100}÷(thermal conductivity ($Wm^{-1}K^{-1}$) of coating layer not including heat radiation filler)   [Expression 2]

TABLE 5

| Classification | Heat radiation part of Example 1 | Heat radiation part of Comparative Example 1 |
|---|---|---|
| Thermal conductivity (W/m · K) | 0.58 | 0.12 |
| Relative gain (%) of thermal conductivity | 383.3 | |

As shown in Table 5, it can be seen that the heat radiation part of Example 1 has considerably higher thermal conductivity compared with the heat radiation part of Comparative Example 1 and thus exhibits excellent heat radiation performance.

Experimental Example 3

Resistance value measurement was performed on heat radiation parts of the PTC units manufactured in Examples 1 to 3 and 23. Specifically, resistance values were measured through a four point probe method and are shown in Table 6 below.

TABLE 6

| Classification | Example 1 | Example 2 | Example 3 | Example 23 |
|---|---|---|---|---|
| Resistance value ($\Omega$/sq.) | $1.3 \times 10^{12}$ | $7.1 \times 10^{13}$ | $9.7 \times 10^{10}$ | $7.1 \times 10^{9}$ |

As shown in Table 6, it can be seen that the heat radiation parts included in the Examples 1 to 3 have a considerably higher resistance value compared with the heat radiation part included in Example 23 and thus exhibit excellent insulating performance.

While the present invention has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims.

The invention claimed is:

1. A positive temperature coefficient unit for a vehicle heater comprising:
a heat generation part which includes positive temperature coefficient elements; a heat radiation part which is provided on at least one surface of the heat generation part and includes a heat radiation base material and a heat radiation film provided on at least a portion of an outer surface of the heat radiation base material to improve heat radiation performance;
wherein the heat radiation base material includes a heat radiation plate disposed adjacent to the heat generation part and a heat radiation fin portion disposed on the heat radiation plate, and the heat radiation film is provided on outer surfaces of both of the heat radiation fin portion and the heat radiation plate;
wherein the heat radiation film is composed of an oxide film and a heat radiation coating layer formed on the oxide layer;
wherein the heat radiation coating layer is formed through an insulating heat radiation coating composition which includes a coating layer-forming component including a main resin which includes a compound represented by Formula 1 below, an insulating heat radiation filler included in an amount of 25-70 parts by weight with respect to 100 parts by weight of the main resin, which is silicon carbide and in which the insulating heat radiation filler has an average particle diameter is 10 nm to 15 μm and a ratio of a particle diameter at 50% to a particle diameter at 97% in a volume-based particle size distribution of the insulating heat radiation filler is less than or equal to 1:4.5, a physical property-improving component which is a silane-based compound included in an amount of 0.5 to 20 parts by weight, an antioxidant included in an amount of 0.1 to 3 parts by weight, a dispersant included in an amount of 0.5 to 20 parts by weight and a UV stabilizer included in an amount of 0.05 to 2 parts by weight;
wherein the coating layer-forming component further includes a curing agent included in an amount of 25-100 parts by weight with respect to 100 parts by weight of the main resin;
wherein the curing agent includes one or more selected from the group consisting of an aliphatic polyamine-based curing agent, an aromatic polyamine-based curing agent, an acid anhydride-based curing agent, and a catalyst-based curing agent; and
wherein the curing agent includes a first curing agent and a second curing agent in a weight ratio of 1:0.5 to 1:1.5, wherein the first curing agent includes an aliphatic polyamine-based curing agent and the second curing agent includes one or more selected from the group consisting of an aromatic polyamine-based curing agent, an acid anhydride-based curing agent, and a catalyst-based curing agent:

[Formula 1]

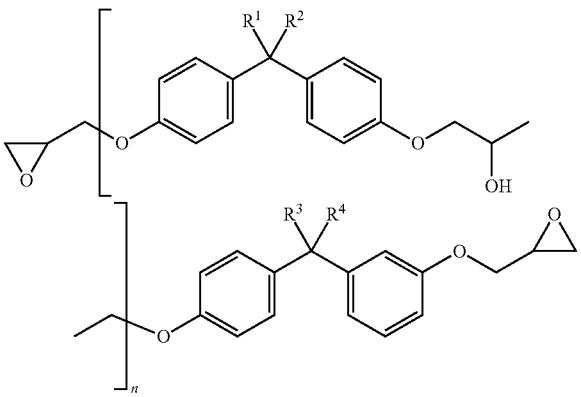

wherein $R^1$ and $R^2$ are each independently a hydrogen atom, a $C_1$-$C_5$ linear alkyl group or a $C_3$-$C_5$ branched alkyl group, and $R^3$ and $R^4$ are each independently a hydrogen atom, a $C_1$-$C_5$ linear alkyl group or a $C_3$-$C_5$ branched alkyl group, and n is a rational number which allows a weight average molecular weight of the compound represented by Formula 1 above to be in a range of 400 to 4,000.

2. The positive temperature coefficient unit of claim 1, wherein the heat generation part includes the positive temperature coefficient elements and an electrode terminal configured to support the positive temperature coefficient elements and apply power to the positive temperature coefficient elements.

3. The positive temperature coefficient unit of claim 1, wherein the heat radiation fin portion is provided in such a manner that a planar heat radiation body is bent multiple times and is provided on the heat radiation plate or a plurality of planar heat radiation bodies disposed perpendicular to the heat radiation plate are spaced apart from each other by a certain interval and are provided on the heat radiation plate.

4. A positive temperature coefficient heater for a vehicle comprising:
a positive temperature coefficient module which includes a plurality of positive temperature coefficient units according to claim 1; and
a circuit module which is electrically connected to the positive temperature coefficient module.

* * * * *